April 8, 1952     L. E. PERKINS ET AL     2,592,461
AIRCRAFT CRASH MARKER

Filed Nov. 30, 1950

INVENTORS
Layton E. Perkins
Gilbert C. Gettleman
BY
Morell & Morell
ATTORNEYS.

April 8, 1952   L. E. PERKINS ET AL   2,592,461
AIRCRAFT CRASH MARKER
Filed Nov. 30, 1950   2 SHEETS—SHEET 2
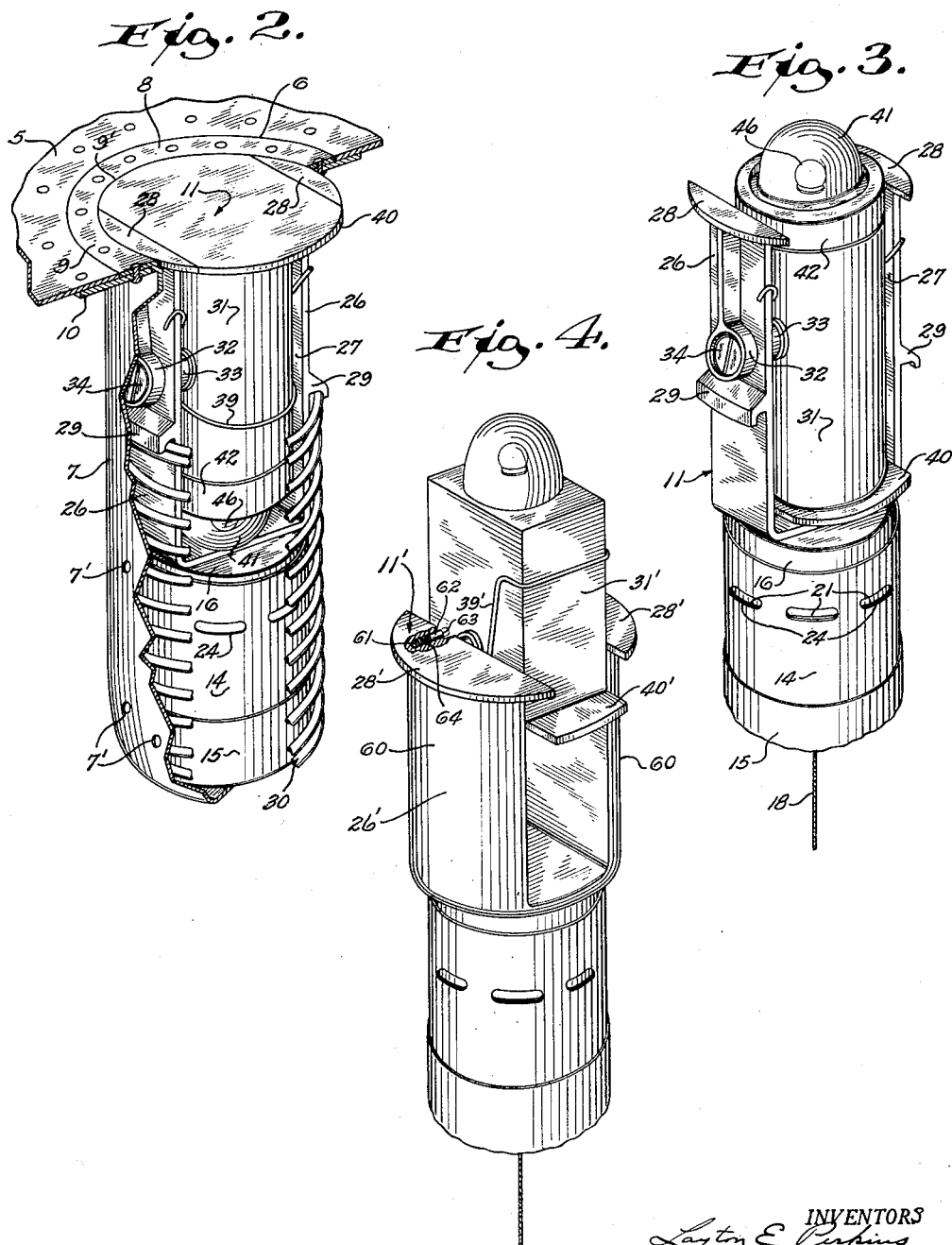
INVENTORS
Layton E. Perkins
Gilbert C. Gittelman
BY
Morsell & Morsell
ATTORNEYS.

Patented Apr. 8, 1952

2,592,461

UNITED STATES PATENT OFFICE 2,592,461

AIRCRAFT CRASH MARKER

Layton E. Perkins and Gilbert C. Gettelman, Milwaukee, Wis.; said Gettelman assignor to said Perkins Application November 30, 1950, Serial No. 198,437

14 Claims. (Cl. 9—9)

This invention relates to improvements in crash markers for air or water craft and embodies certain of the principles of operation of the retrievers for submerged articles disclosed in my Patent 2,479,021, issued August 16, 1949.

A principal object of the invention is to provide a marker having visual means for indicating the location of submerged air or water craft both in the daytime and at night, which marker may also have sound generating means for additionally indicating said location.

A further object of the invention is to provide an improved marker having a novel type of releasable buoy unit which is automatically ejected from the craft upon submersion thereof, which buoy may contain a quantity of dye for coloring the water surface above the craft to indicate the location of the same during the daytime, and may also be provided with illuminating means to indicate the location at night.

A further object of the invention is to provide a marker of the class described wherein the buoy is provided with a sound generating device which makes it possible for the buoy to be located by sound equipment carried in a submarine or other water craft.

A further object of the invention is to provide an improved marker of the class described which can be mounted in the aircraft fuselage flush with the skin thereof in such a manner that the streamlining of the aircraft is not affected thereby.

A further more specific object of the invention is to provide an improved marker of the class described wherein the buoy assembly is provided with a rotatable electric lamp, normally in inverted position, there being spring means for rotating the buoy 180 degrees to upright position upon release of said assembly from the craft.

A further object of the invention is to provide an improved aircraft marker of the class described wherein there is a mercury switch connected in the circuit with the electric lamp, said switch being operable to automatically turn on the lamp when the buoy is in upright position.

A further object of the invention is to provide an improved aircraft marker wherein the ejectible buoy assembly is provided with an enclosed telescopic dye chamber and wherein the telescopic wall portions of said chamber are formed with aligned axially offset apertures, there being spring means for urging said telescopic wall members away from each other in an axial direction upon ejection of the buoy assembly to cause registration of said apertures and permit water to enter therethrough.

A further object of the invention is to provide an improved aircraft marker of the class described which is so constructed that when in assembled condition within an aircraft fuselage it is well protected from the effects of the weather.

A further object of the invention is to provide an improved aircraft marker which is strong and durable, which is relatively simple in construction, and which is otherwise well adapted for the purposes described.

With the above and other objects in view, the invention consists of the improved aircraft marker, and all of its parts and combinations, as set forth in the claims, and all equivalents thereof.

In the drawings accompanying and forming a part of this specification, wherein are shown two forms of the invention, and wherein like characters of reference indicate the same parts in all of the views:

Fig. 2 is a fragmentary perspective side view on a reduced scale of an improved marker shown in Fig. 1, parts being broken away;

Fig. 3 is a perspective side view of the ejectible buoy assembly of the improved aircraft marker, after said assembly has been ejected from its housing; and Fig. 4 is a view similar to Fig. 3 showing the ejectible buoy assembly of a modified form of the invention.

Figure 1:
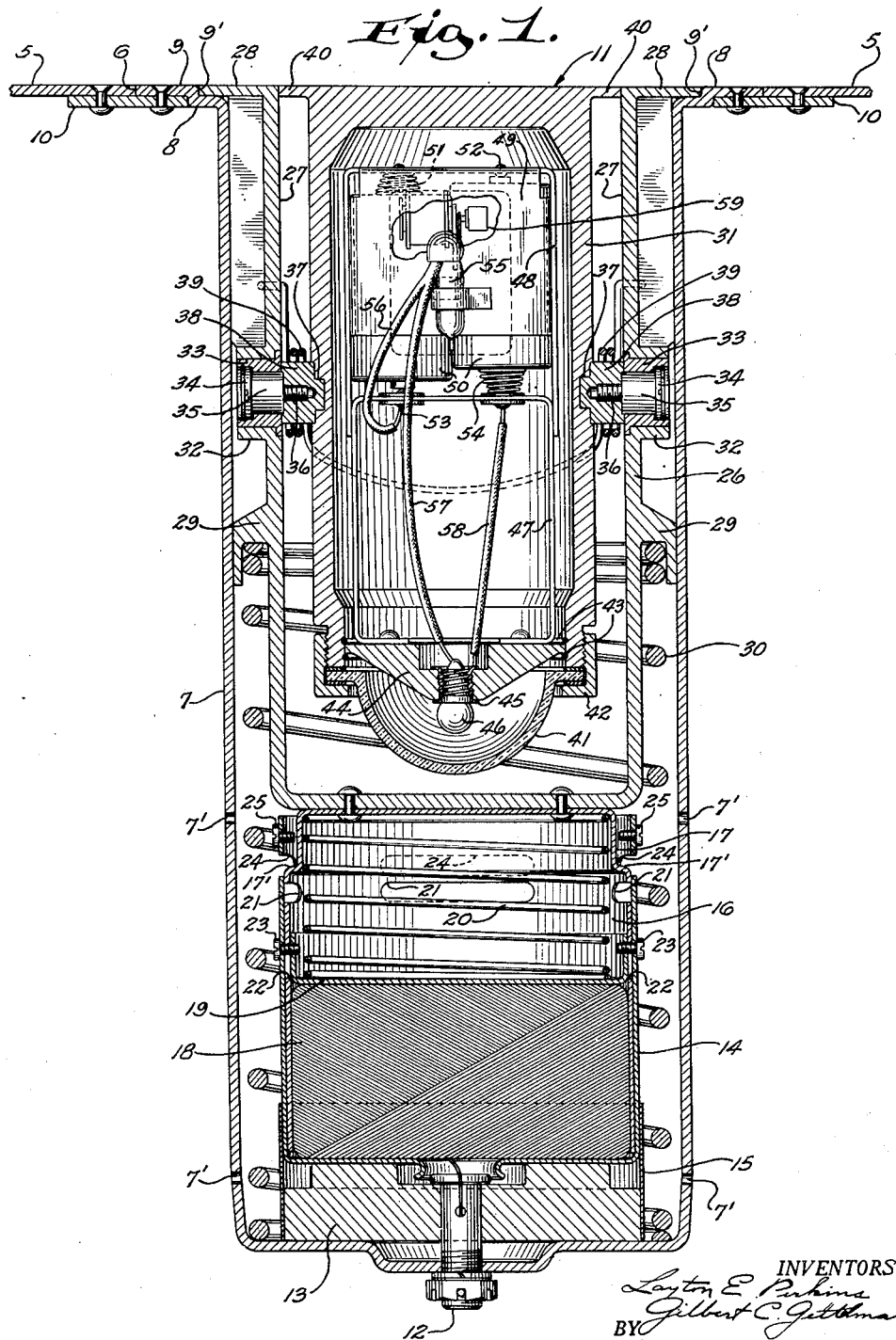
Fig. 1 is a longitudinal sectional view taken through the preferred form of the invention showing the same in assembled condition.

Referring more particularly to Figs. 1 and 2 of the drawing, the numeral 5 indicates the plating or skin on the top of a craft in which the improved marker is mounted. The skin 5 is formed with an aperture 6, preferably circular. An elongated cylindrical cup-shaped housing 7 is formed at its open end with an outwardly directed annular flange 8 which is preferably formed with an annular axially offset portion 9 to form an annular recessed seat 9'. The housing 7 is preferably formed with small apertures adjacent its closed end as at 7'. The diameter of the flange 8 is substantially equal to the diameter of the aperture 6, and the housing 7 is positioned with the outer surface of the offset portion 9 of the flange 8 flush with the outer surface of the skin 5 of the fuselage, as shown. An annular mounting ring 10 may underlie the flange portion 9 as well as the portions of the skin 5 adjacent the margins of the aperture 6. The ring 10 is preferably riveted to both the skin 5 and the flange portion 9, as shown.

Mounted within the housing 7 is a buoy assembly 11. The buoy assembly 11 is normally anchored within the housing 7 by means of a tubular release member 15 which in turn is fixed to a cylindrical plug 13, the latter being held in abutment with the closed end of the housing 7 by a bolt 12. The release member 15 is made of material such as blotting paper, which upon becoming soaked with water disintegrates and has very little strength. The use of such material is fully set forth in my Patent No. 2,479,021.

The buoy assembly 11 includes a metal cup-shaped member 14 which is positioned against the inner end of the plug 13 and is secured to the plug 13 in coaxial relationship solely by the tubular release member 15. The release member 15 may be fixed to the plug 13 and the member 14 by an adhesive or any suitable means.

An inverted cup-shaped member 16 is positioned telescopically within the cup-shaped member 14, as shown, and is formed adjacent its closed end with a portion of reduced diameter 17 to form an annular shoulder 17'. A roll of cord 18 is positioned within the cup-shaped members 14 and 16, as shown. One end of the cord 18 is secured to the bolt 12, as shown, and the other end of said cord is suitably secured to the buoy assembly 11.

A relatively short cup-shaped member 19 is positioned within the inverted cup-shaped member 16 and abuts the top of the roll of cord 18, as shown. A helical compression spring 20 is positioned within the cup-shaped members 16 and 19, as shown, urging said members in opposite directions. The inverted cup-shaped member 16 is formed with a plurality of openings 21, preferably in the form of horizontal slots in its side walls above the cup shaped member 19, and the member 16 is also formed with a pair of diametrically opposed axially extending slots 22. The cup-shaped members 14 and 19 are connected by a pair of screws 23 which extend through the slots 22, as shown. The cup-shaped member 14 is formed in its side walls adjacent its open end with a plurality of horizontal slots 24 which are aligned in an axial direction with the slots 21, and which are normally axially offset therefrom, as shown. Screws 25 extend through diametrically opposite side wall portions of the member 14 adjacent its open end, and said screws project radially inwardly as shown.

Fixed, as by riveting, to the closed end of the inverted cup-shaped member 16 is a U-shaped frame member 26. The opposite arms of the member 26 are preferably provided with substantially parallel flat inner surfaces 27, and the upper end of each arm of the frame member 26 is formed with an outwardly projecting flange 28. The flanges 28 are segmental in shape and are positioned on the seat within the recess 9' flush with the surface of the skin 5 of the fuselage, as shown.

Formed on the arms of the U-shaped frame 26 are outwardly and downwardly directed ears 29, and positioned in the housing 7 below the ears 29 around the frame member 26, and around the cup-shaped member 14 and tubular release member 15, is a helical compression spring 30. The spring 30 abuts the closed end of the housing 7 at one end, and has its other end in abutment with the ears 29 as shown.

An elongated cup-shaped casing 31 is positioned within the housing 7 between the arms of the frame 26. The arms of the frame 26 are formed with diametrically opposed bearing bosses 32, said bosses each being bored to receive a flanged bearing sleeve 33. A trunnion screw 34, positioned in each bearing sleeve 33, has a cylindrical shank portion 35 of substantially the same diameter as the bore of the sleeve 33, and has a threaded inner end portion 36 of reduced diameter. The buoy casing 31 if formed with a pair of external circular recesses 37 which are diametrically opposed and which are coaxially aligned with the screws 34. A pair of cylindrical trunnion bushings 38 are each axially bored to threadedly receive the threaded end portion 36 of one of the screws 34, and at their inner ends the bushings 38 are formed with portions of reduced diameter which are positioned in the recesses 37 of the casing 31. The casing 31 is rotatable on the trunnion bushings 38. A torsion spring 39 has a pair of helical sections surrounding the trunnion bushings 38, and has an intermediate portion joining said sections and engaging the buoy casing 31. The ends of the spring 39 are hooked around the arms of the frame 26, as shown, and the spring 39 urges the casing 31 about its pivotal mounting toward the upright position thereof shown in Fig. 3, which position is offset 180 degrees from the position of Figs. 1 and 2.

The closed end of the casing 31 is formed with a radially outwardly directed flange 40 which is flush with the end of said casing and which is also flush with the segmental flanges 28 of the brackets 26. The flange 40 has a pair of cut off parallel side edges which are of the same length as and in abutment with the inner edges of the segmental flanges 28. The flange 40 has arcuate end edges which abut the edges of the recess 9' and which have the same radius of curvature. It is apparent from Fig. 2 that the segmental flanges 28, the end wall of the casing 31, and flange portions 40 completely close the recess 9'.

A hemispherical globe 41 of transparent material is held in sealing position against the open end of the casing 31 by means of an annular collar 42 threaded on said casing. The inner wall of the casing 31 adjacent the open end thereof is formed with a pair of spaced annular grooves to receive a pair of snap rings 43. Held by the snap rings 43 is a disk member 44 of insulating material which is generally triangular in cross-sectional shape to cause the central portion thereof to extend into the globe 41, as shown. The disk 44 is provided with a lamp receiving socket or sleeve 45 which is threaded to receive a bulb 46.

Fixed, as by riveting, to the disk 44 is a generally U-shaped bracket 47 which projects into the casing 31 and has a second generally U-shaped bracket 48 fixed thereto. Fixed to the bracket member 48 is a generally rectangular enclosure 49 formed of sheet metal. Positioned in the enclosure 49 are a pair of conventional flashlight batteries 50. The upper end of the bracket 48 is provided with a compression spring contact 51 for engaging the case of one cell and with a fixed contact 52 for engaging the center pole of the other cell. The bracket 47 is provided with a fixed contact 53 for engaging the center pole of the first of said batteries, said contact being insulated from the bracket 47. The bracket 47 is also provided with a compression spring contact 54 which engages the case of the second battery and which is also insulated from the bracket 47. Mounted on the enclosure 49 is a mercury switch 55 which is connected by wires 56 and 57 with the contact 53 and with the center contact of the bulb 46 respectively. The contact 54 is connected to the socket 45 by means of a wire 58. The mercury switch 55 is in open condition when the case 31 is in the inverted position shown in Fig. 1, and the contacts are adapted to close the circuit between the wires 56 and 57 when the casing 31 is rotated to the upright position of Fig. 3, the dome 41 and the bulb 46 being uppermost when in the position of Fig. 3. It is apparent that the pivotally mounted portion of the buoy assembly 11 is essentially the type of light which is commonly known as a flashlight.

Also mounted within the casing 31 and on the enclosure 49 is a sound generating device 59 which may take the form of a buzzer and which is also connected to the contacts 53 and 54. The buzzer 59 is therefore operated simultaneously with the lamp 46, and when operating in the water generates sound which can be picked up by sound gear on a water craft such as a submarine. Thus, even if a submarine is under water so that the float cannot be seen, the device may be located with the aid of sound.

The operation of the improved marker is substantially as follows: When a craft such as an airplane equipped with the improved marker is forced down at sea and becomes submerged, water enters the apertures 7'. Upon exposure to the water, the tubular release member 15 becomes soaked and thereby becomes so weakened that the expanding force of the spring 30 causes rupture adjacent the base of the cup-shaped member 14. As the release member 15 ruptures, the spring 30 forcibly ejects the buoy assembly 11 from the open end of the housing 7. The spring 30, plug 13 and bolt 12 remain in the housing 7. As the buoy assembly leaves the housing 7, the spring 39 rotates the casing 31 180 degrees to the position of Fig. 3. Since the end of the casing 31 adjacent the dome 41 is substantially empty, it is sufficiently buoyant to cause the ejected buoy assembly 11 to rise in the water with the casing 31 in upright position, as shown in Fig. 3. Since one end of the line 18 is anchored to the bolt 12, which bolt in turn is anchored to the aircraft, and since the other end of the line is anchored to the ejectible buoy assembly 11, the line 18 pays out from the roll and continues to connnect the aircraft with the buoy assembly as said assembly rises to the surface.

As soon as the casing 31 assumes the upright position shown in Fig. 3, the mercury switch 55 causes current to flow from the batteries 50 to the lamp 46 and to the buzzer unit 59. This, of course, causes the lamp 46 to become illuminated and causes the buzzer 59 to generate sound. In addition, ejection of the buoy assembly 11 from the housing 7 permits the spring 20 to move the cup-shaped members 14 and 16 apart in an axial direction until the shoulder 17' abuts the screws 25. In this position the slots 21 register with the slots 24 to permit dye which may be placed in the dye chamber to become exposed to water, the latter having entered through the registering slots 21 and 24. The water surrounding the floating buoy assembly soon becomes colored by the dye and is visible for a relatively great distance. The light from the bulb 46 is also clearly visible particularly at night.

If the aircraft should be submerged in water having a depth greater than the length of the cord 18, the assembly 11 would be below the surface and would be difficult to locate by visual means. The buzzer 59 operates at such times, however, and since shipboard sound equipment, such as Sonar, can pick up the sound generated by the buzzer 59, the source of the sound can be located by such equipment. If desired, the cord 18 can be omitted, and when omitted, the buoy assembly will serve the purpose of indicating the general area of the aircraft until it floats away.

Fig. 4 shows a modified form of the invention wherein there is a rectangular casing 31' which contains the same equipment as the casing 31 of the preferred form of the invention, but which does not have a buoyant space adjacent the lamp end such as 31 has. The casing 31' is pivoted adjacent its flanged end rather than intermediate its length. In the form of the invention shown in Fig. 4, buoyant chambers 60 form the arms of the frame 26' and the casing 31' is pivotally carried at the upper ends of the chambers 60 as shown. In order to lock the part 31' in the position of Fig. 4, one of the buoyant chambers 60 may be formed with a cylindrical recess 64 to receive a pin 61 and a compression spring 62. The latter urges said pin into contact with the adjacent side wall of the case 31'. This side wall is formed with a recess 63 which is adapted to receive the end of the pin 61 when the case 31' is in the upright position of Fig. 4. When the pin 61 is seated in the recess 63, the casing 31' is locked against rotation. In both forms of the invention the dye chamber portion of the buoy assembly is substantially non-buoyant and is disposed below the buoyant chambers of the buoy assembly. The ejection of the buoy assembly 11' of the modified form of the invention and the operation thereof after release is substantially identical with that of the buoy assembly 11 of the preferred form.

Various changes and modifications may be made without departing from the spirit of the invention, and all of such changes are contemplated as may come within the scope of the claims.

What we claim as the invention is:

1. A marker assembly comprising: an electrically operated signalling device; a housing within which said signalling device is normally positioned with the signalling device in inverted position; said signalling device having a signalling element, having a battery, having an electrical circuit connecting said signalling element and battery, and including a switch having gravity actuated contact means which is operable to close the circuit to said signalling element only when the signalling device is in upright position; means including a member releasable when submerged in water in response to the action of water thereon for releasably maintaining said signalling device within said housing, and means for causing the signalling device to assume an upright position following release.

2. A marker assembly comprising: an electrically operated signalling device; a housing within which said signalling device is normally positioned with the signalling device in inverted position; said signalling device having a signalling element, having a battery, having an electrical circuit connecting said signalling element and battery, and including a switch having gravity actuated contact means which is operable to close the circuit to said signalling element only when the signalling device is in upright position; means including a member releasable when submerged in water for releasably maintaining said signalling device within said housing, a retrieving line connecting said signalling device and housing, and means for causing the signalling device to assume an upright position following release.

3. A marker assembly comprising: a frame; a casing pivotally connected to said frame for swinging movement on said pivot from an inverted inoperative to an operative position; an electrically operated signalling device in said casing; a battery in said casing; and an electrical circuit connecting said signalling device and battery and including a switch having gravity actuated contact means which is operable to close the circuit to said signalling device only when the casing is in upright position; means including a member releasable when submerged in water for releasably connecting said frame and casing to an aircraft and for normally maintaining the casing in inverted position; means providing buoyancy in said frame and casing; and means for causing the casing to swing to an upright position following release.

4. A marker assembly comprising: a frame; a casing pivotally connected to said frame for swinging movement on said pivot from an inverted inoperative to an operative position; an electrically operated signalling device in said casing; a battery in said casing; an electrical circuit connecting said signalling device and battery and including a switch having gravity actuated contact means which is operable to close the circuit to said signalling device only when the casing is in upright position; means including a member releasable when submerged in water in response to the action of water thereon for releasably connecting said frame and casing assembly to an aircraft and for normally maintaining the casing in inverted position; means providing buoyancy in said frame and casing assembly; means for causing the casing to swing to an upright position following release; and a retrieving line connected at one end to said frame and adapted to be connected at its other end to an aircraft or the like.

5. A device for locating submerged craft comprising: an electrically operated audible signalling device, said signalling device having a sound generating element, having a battery, and having an electrical circuit connecting said sound generating element and battery, and including a switch having gravity actuated contact means; a housing within which said signalling device is normally positioned with the switch in inverted position wherein the electrical circuit is broken, said switch being operable to close said circuit only when the signalling device is in a reverse position from that which it assumes when in the housing; means including a member releasable when submerged in water in response to the action of water thereon for releasably maintaining said signalling device within said housing; and means for causing said signalling device to change its position following release and thereby cause the switch to operate said signalling element.

6. A marker assembly comprising: a frame; a line connected to said frame and adapted to be connected to an aircraft or the like; a flashlight pivotally connected to said frame for swinging movement on said pivot from an inoperative position to an operative position, said flashlight having a lamp, having a battery, and having an electrical circuit connecting said lamp and battery and including a switch having contact means which is operable to close the circuit to said lamp only when the flashlight is in said operative position; spring means normally urging said flashlight about its pivot to said operative position; means including a member releasable when submerged in water in response to action of water thereon for releasably connecting said frame and flashlight assembly to an aircraft and for normally maintaining the flashlight in inoperative position against the action of said spring means; and means providing buoyancy in said frame and flashlight assembly.

7. A marker assembly comprising: a frame; a flashlight pivotally connected to said frame for swinging movement on said pivot from an inoperative position to an operative position, said flashlight having a lamp, having a battery, and having an electrical circuit connecting said lamp and battery and including a switch having contact means which is operable to close the circuit to said lamp only when the flashlight is in said operative position; spring means normally urging said flashlight about its pivot to said operative position; means including a member releasable when submerged in water in response to action of water thereon for releasably connecting said frame and flashlight assembly to an aircraft and for normally maintaining the flashlight in inoperative position against the action of said spring means; and means providing buoyancy in said frame and flashlight assembly.

8. A marker assembly comprising: a frame having a buoyant chamber; a line connected to said frame and adapted to be connected to an aircraft or the like; a flashlight pivotally connected to said frame for swinging movement on said pivot from an inoperative position to an operative position, said flashlight having a lamp, having a battery, and having an electrical circuit connecting said lamp and battery and including a switch having contact means which is operable to close the circuit to said lamp only when the flashlight is in said operative position; spring means normally urging said flashlight about its pivot to said operative position; and means including a member releasable when submerged in water in response to action of water thereon for releasably connecting said frame and flashlight assembly to an aircraft and for normally maintaining the flashlight in inoperative position against the action of said spring means.

9. A marker assembly comprising: a frame; a line connected to said frame and adapted to be connected to an aircraft; a casing pivotally connected to said frame for swinging movement on said pivot from an inoperative position to an operative position, an electrically operated signalling device in said casing, a battery in said casing, and an electrical circuit connecting said signalling device and battery and including a switch having contact means which is operable to close the circuit to said signalling device only when the casing is in said operative position; spring means normally urging said casing about its pivot to said operative position; means including a member releasable when submerged in water in response to action of water thereon releasably connecting said frame and casing assembly to an aircraft and for normally maintaining the casing in operative position against the action of said spring means; and means providing buoyancy in said frame and assembly.

10. A marker assembly comprising: a frame; an electrically operated signalling device pivotally connected to said frame for swinging movement on said pivot from an inoperative inverted position to an operative upright position, said signalling device having a signalling element, having a battery, and having an electrical circuit connecting said signalling element and battery and including a switch having contact means which is operable to close the circuit to said signalling element only when the signalling element is in said operative position; spring means normally urging said signalling device about its pivot to said operative position; a housing within which said frame and signalling device is normally positioned with the signalling device in inverted position, said housing being of a size to prevent pivotal movement of said signalling device when the latter is positioned therein; means releasable when submerged in water in response to action of water thereon for releasably holding said frame and signalling device within said housing; and means providing buoyancy in said frame and signalling device.

11. A marker assembly comprising: a frame; a watertight flashlight casing pivotally connected to said frame for swinging movement on said pivot from an inoperative inverted position to an operative upright position, said casing having a buoyant chamber, having a lamp, having a battery, and having an electrical circuit connecting said lamp and battery and said circuit including a switch having gravity actuated contact means which is operable to close the circuit to said lamp only when the lamp is in said upright position; spring means normally urging said flashlight about its pivot to operative position; and means including a member releasable when submerged in water in response to action of water thereon for releasably connecting said frame and flashlight assembly to an aircraft and for normally maintaining said flashlight in inverted position against the action of said spring.

12. In a marker: a float assembly; an inverted cup-shaped member fixed to said float assembly and formed in its sidewall with an aperture; a second cup-shaped member telescopically associated with said inverted cup-shaped member and forming therewith a dye chamber, said second cup-shaped member being formed in its sidewall with an aperture which is alineable in response to telescopic movement of one of said cup-shaped members with the aperture of said inverted cup-shaped member; spring means for urging said cup-shaped members axially apart; stop means for limiting such axial movement to that which causes registration of said apertures, and means for releasably maintaining said cup-shaped members in positions wherein the apertures are axially offset to thereby seal the dye chamber.

13. A marker assembly for aircraft or the like, comprising: an elongated apertured housing having an open end and adapted to be mounted within the fuselage of an aircraft with its open end upwardly; a buoy assembly positioned in said housing; spring means within said housing tending to eject said buoy assembly from the open end of said housing; releasable means normally connecting said buoy assembly to said housing and holding said assembly within said housing against the action of said spring means, said releasable means being releasable in response to the action of water thereon to permit said spring to eject said buoy assembly from the open end of said housing, and said buoy assembly comprising: an elongated frame connected to said release member and engaged by said spring means; an elongated watertight signalling device pivotally connected to said frame and having a signalling element at one end, said signalling device being in inverted position within said housing, the ends of said frame and of said signalling device adjacent the open end of the casing being shaped to close the open end of said housing, and said signalling device being of such size that it cannot pivot when positioned in said housing; spring means for urging said signalling device about its pivot toward an upright position; and an operating switch in said signalling device having contact means responsive to gravity to operate said signalling device only when the latter is in upright position.

14. A marker assembly for aircraft or the like, comprising: an elongated apertured housing having an open end and adapted to be mounted within the fuselage of an aircraft with its open end upwardly; a buoy assembly positioned in said housing; a compression spring within said housing tending to eject said buoy assembly from the open end of said housing; a release member normally connecting said buoy assembly to said housing and holding said assembly within said housing against the action of said compression spring, said release member being constructed of material which is unable to resist the ejecting stresses of said compression spring when acted upon by water, and said buoy assembly comprising: an elongated frame connected to said release member and engaged by said compression spring; an elongated watertight electrically operated signalling device pivotally connected to said frame, said device being in inverted position within said housing, the ends of said frame and said device adjacent the open end of the housing being shaped to close the open end of said housing, and said device being of such size that it cannot pivot relative to said frame within said housing; a torsion spring for urging said device about its pivot toward an upright position; an operating switch in said device having gravity actuated contact means which causes operation of said signalling device when said device is in upright position only; and means providing buoyancy in said buoy assembly.

LAYTON E. PERKINS.
GILBERT C. GETTELMAN.

REFERENCES CITED

The following references are of record in the file of this patent:

UNITED STATES PATENTS

| Number | Name | Date |
| --- | --- | --- |
| 388,971 | Hichborn | Sept. 9, 1888 |
| 551,081 | Guest et al. | Dec. 10, 1895 |
| 2,479,021 | Perkins | Aug. 16, 1949 |
| 2,545,179 | Voorhees | Mar. 13, 1951 |
| 2,558,870 | Michelman | July 3, 1951 |